Patented Oct. 6, 1931

1,825,738

UNITED STATES PATENT OFFICE

PAUL KLEIN AND FRANCIS GÁBOR, OF BUDAPEST, HUNGARY, ASSIGNORS, BY MESNE ASSIGNMENTS, TO AMERICAN ANODE INC., A CORPORATION OF DELAWARE

PRODUCING DIPPED GOODS FROM ORGANIC DISPERSIONS

No Drawing. Application filed January 21, 1928, Serial No. 248,556, and in Hungary and Germany February 23, 1927.

The invention relates to the production of goods by means of repeated dipping operations from aqueous or other dispersions of organic substances primarily from natural and if desired concentrated rubber dispersions to which additional substances may have been added, or from artificial rubber dispersions or moreover from artificial or natural dispersions of other vegetable resins such as for example guttapercha, balata, either in an unvulcanized or vulcanized state, or moreover from dispersions of reclaimed or vulcanized rubber as well as from other dispersions of organic substances such as dispersions of casein, cellulose esters and artificial resins.

The repeated dipping operations may be carried out either with the aid of impermeable moulds upon which the dispersions agglomerate owing to adhesion or by the employment of means known per se, adapted to promote coagulation or agglomeration. Thus for example moulds can be employed, the material of which partly goes into solution and supplies the ions effecting the coagulation, for example gypsum moulds when working with aqueous rubber dispersions. Moreover absorbent or porous moulds such as for example moulds of unglazed clay may be employed and the agglomeration may be promoted by aspiration at the side opposite the dispersion, or by imbibing the clay moulds with substances adapted to effect coagulation and to give up these substances to the dispersion to be treated. The suction can be, if desired maintained during the drying period in order to promote the drying. Moreover moulds may be employed which are provided with an absorbent coating of for example gelatine, which coatings are imbibed with substances promoting agglomeration or coagulation. The dipping moulds may moreover be connected to a source of current setting up an electric potential, for the purpose of promoting the agglomeration upon the moulds by means of electrical action. It is self-understood that a plurality of means for accelerating the deposition may also be employed simultaneously or in conjunction and may also be combined with other suitable methods.

The essence of the invention lies in the fact that the dipping moulds during the interval of the drying or solidifying effected between the individual dippings and if desired also during the dipping into the dispersion are heated above the temperature of their surroundings. The heating may be effected in any suitable way for instance by passing a gaseous or liquid heating agent through the moulds or by electrical inductive or resistance heating. If the dipping moulds are porous, the heating may also be effected by means of a solution passing through the interior of the moulds which diffuses through the pores of the mould and promotes the agglomeration of the dispersion on the surface of the mould.

In cases where the deposition base serves for the production of rotary hollow bodies or endless goods such as tubes, bands, impregnated or coated substances or coated metallic conductors and moves continuously through the dispersion for example as an endless deposition band or a revolving for example cylindrical precipitation mould, core or drum or as the endless metal object to be coated, the deposition base may also be heated in such a manner that not only the portions dipping into the liquid but also those portions outside the liquid are heated, so that in the production of endless closed goods the deposit is formed and dried in a continuous manner.

In order to increase the effect it is generally advantageous to select the heating temperatures as high as possible but care must be taken to avoid gas and vapour bubbles being produced upon the deposition surface owing to the increase in temperature. The temperature to which the moulds are heated may be uniform during the heating period or may vary. Thus for example during the dipping periods the heating may be moderate, whereas it may be increased during the settling and drying periods between the individual dippings. The extent of the heating may also differ during the individual periods of the process.

It is advantageous to keep the dipping mould removed from the liquid in a moist atmosphere during the heating.

Finally the mould may also be constructed in such a manner that individual parts thereof can be heated to different degrees.

Thus for example when employing a rotatable drum as deposition base the portion dipping into the liquid and the portion protruding from the liquid for the time being can be heated to different degrees.

The invention considerably accelerates the working process by shortening the time necessary for drying.

Having now particularly described and ascertained the nature of our said invention and in what manner the same is to be performed, we declare that what we claim is:—

1. A process for the production of goods from aqueous or other dispersions of organic substances particularly from natural or artificial rubber dispersions by repeated dipping in which the dipping mould is heated during the intervals between the individual dippings and if desired also during the dipping into the dispersion.

2. Process as set forth in claim 1, in which the heating is effected by a heating agent passed through the moulds.

3. Process as set forth in claim 1, in which the heating is effected by electric current.

4. Process as set forth in claim 1, in which porous moulds are employed for the dipping and in which the heating is effected by means of a solution passed through the interior chamber, the diffusion of which through the mould promotes the agglomeration of the dispersion or the solidifying of the precipitate.

5. Process as set forth in claim 1, in which the degree of the heating during the dipping of the mould into dispersion differs from the degree of heating during the period when the mould is outside the liquid.

6. Process as set forth in claim 1, in which individual portions of the deposition base are heated to different degrees of temperature.

7. Process as set forth in claim 1, in which the drying between the individual dipping operations is effected in a moist atmosphere.

In testimony whereof we affix our signatures.

DR. PAUL KLEIN.
FRANCIS GÁBOR.